United States Patent [19]
Bell

[11] 3,791,042
[45] Feb. 12, 1974

[54] PENDULUM TYPE BOREHOLE DEVIATION MEASURING APPARATUS

[76] Inventor: Forrest E. Bell, Box 1675, Pecos, Tex. 79772

[22] Filed: Sept. 13, 1971

[21] Appl. No.: 179,824

[52] U.S. Cl. .................. 33/304, 33/312, 33/366, 175/45
[51] Int. Cl. .................. G01c 9/06, E21b 47/22
[58] Field of Search ..... 33/304, 308, 312, 283, 366; 175/45

[56] References Cited
UNITED STATES PATENTS

| | | | |
|---|---|---|---|
| 2,171,156 | 9/1939 | Lawton | 33/206 D |
| 2,282,431 | 5/1942 | Smith et al | 33/312 |
| 3,004,613 | 10/1961 | Morphey | 33/312 |
| 3,588,908 | 6/1971 | Lindsey | 175/45 |

Primary Examiner—Robert B. Hull
Assistant Examiner—Richard R. Stearns
Attorney, Agent, or Firm—Marcus L. Bates

[57] ABSTRACT

Apparatus for measuring deviation in a vertically disposed borehole. The apparatus is housed within a sub, and the drilling operation can be momentarily suspended at any time and the hole deviation measured. The apparatus includes a plurality of spaced apart pendulum type sensor devices, each connected to an oscillator which produces a signal of a frequency which is proportional to the magnitude of the deviation. A receiver located at the surface of the ground discriminates between the various frequencies of the signals and correlates the frequency reading with hole deviation.

5 Claims, 13 Drawing Figures

Patented Feb. 12, 1974
3,791,042
2 Sheets-Sheet 1
FIG. 1
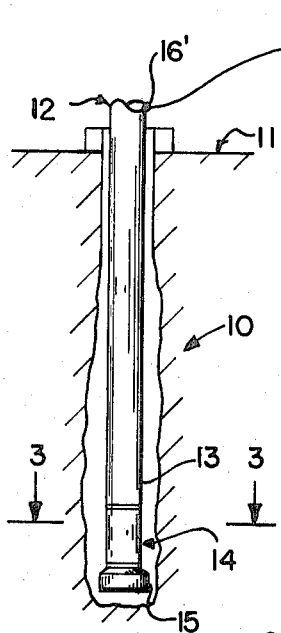
FIG. 2
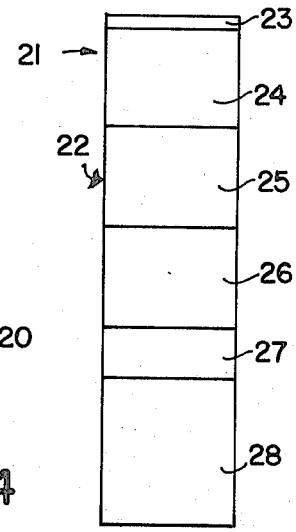
FIG. 3
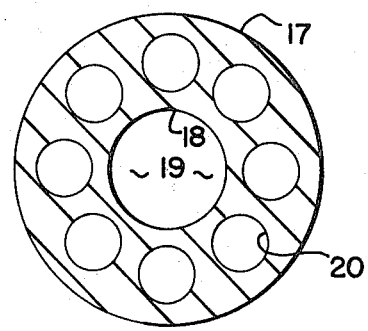
FIG. 4
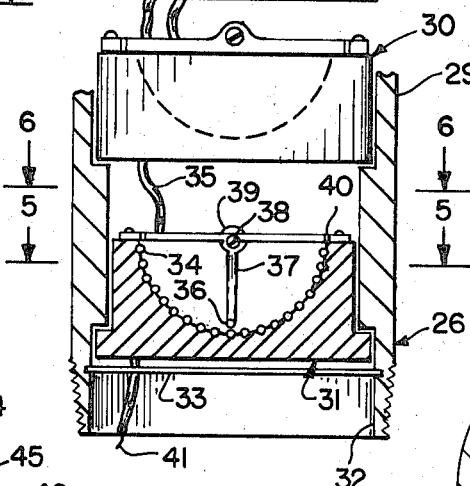
FIG. 5
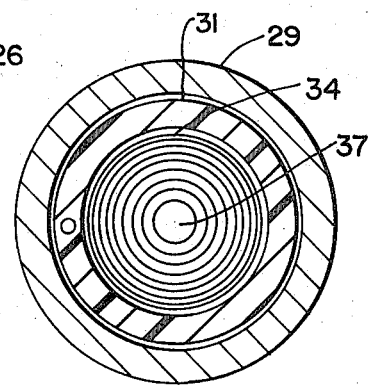
FIG. 6
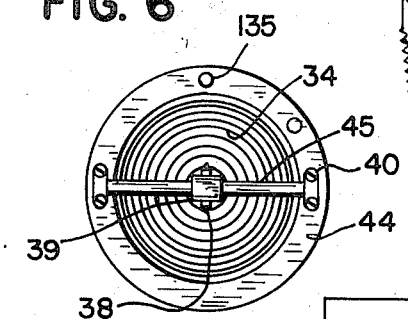
FIG. 7
INVENTOR.
FORREST E. BELL
BY
MARCUS L. BATES
HIS AGENT Patented Feb. 12, 1974

*INVENTOR.*
FORREST E. BELL

BY

MARCUS L. BATES
HIS AGENT

PENDULUM TYPE BOREHOLE DEVIATION MEASURING APPARATUS

BACKGROUND OF THE INVENTION

In drilling boreholes it is advantageous from time to time to measure the angular displacement of the hole from the vertical so as to enable corrective measures to be employed to produce a straight hole. In deep well formation this is especially important for various reasons appreciated to those skilled in the art.

Heretofore, pendulum type borehole deviation measuring apparatus have been proposed, including the use of pendulum type sensors connected to sonic apparatus for the generation of a signal which can be transmitted to the surface of the ground along the drill string, as evidenced by the U.S. Pats. to Murphy, No. 3,004,613; Andrews, Jr. No. 2,637,527; and Armstrong, No. 3,077,233, to which reference is made for further background of this invention.

The use of pendulum type deviation apparatus in conjunction with sonics has been proven feasible by the prior art, however, there is still lacking in the prior art devices sufficiently sensitivity in the sensor apparatus which enables the measurement of small deviations from the vertical and which can withstand the impact and shock usually experienced while the drilling operation is in progress.

Accordingly, it is desirable to provide and make available means by which boreholes can be continuously monitored while they are being formed. Furthermore, the ability to measure small angular displacements from the vertical is desirable in this type apparatus. Accordingly, the present invention provides improvements in prior art apparatus such as mentioned above.

SUMMARY OF THE INVENTION

This invention comprehends apparatus for determining and measuring borehole deviation, comprising a source of power connected to a sensor apparatus which actuates an oscillator which in turn is connected to a sonic generator. The apparatus is housed within a sub, with the sub forming a lower marginal end portion of the drill string. A centrifugal switch de-energizes the apparatus while the drill bit is being turned, and when the drill string is motionless, the switch energizes the apparatus so as to enable the sensor to measure the displacement of the drill string from the vertical, thereby generating a sonic signal which can be received and analyzed at the well head. The sonic signal has a frequency indicative of the magnitude of the hole deviation.

In order to increase the sensitivity of the sensor, a plurality of pendulum type sensing units are superimposed relative to one another, with each sensing unit measuring different increments of the angular displacement of the drill string sub.

A primary object of this invention is the provision of apparatus for determining borehole deviation.

Another object of the present invention is to provide improvements in sensing units for use in conjunction with downhole measuring apparatus.

A further object of this invention is the provision of a plurality of sensing units which are combined together in a manner to increase the sensitivity of a downhole measuring apparatus.

A still further object of this invention is to provide an improved combination of elements for measuring borehole deviation.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 is a schematical cross-sectional representation of a borehole forming operation using apparatus made in accordance with the present invention;

FIG. 2 is an enlarged diagrammatical representation of apparatus made in accordance with the present invention;

FIG. 3 is an enlarged, cross-sectional representation taken along line 3—3 of FIG. 1;

FIG. 4 is an enlarged, fragmentary, part cross-sectional view of part of the apparatus seen in the foregoing figures;

FIGS. 5 and 6, respectively, are cross-sectional views taken along lines 5—5 and 6—6 respectively, of FIG. 4;

FIG. 7 is a schematical representation of circuitry and apparatus used in conjunction with the present invention;

DETAILED DESCRIPTION OF THE PREFERRED EMBODIMENT

Figure 8:
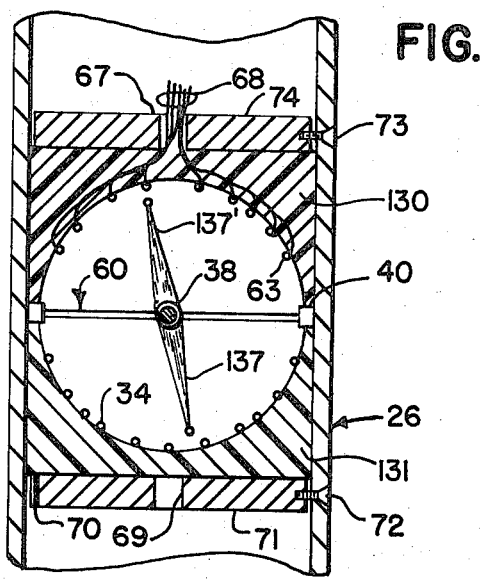
FIG. 8 is a cross-sectional view of another embodiment of the present invention.
Figure 9:
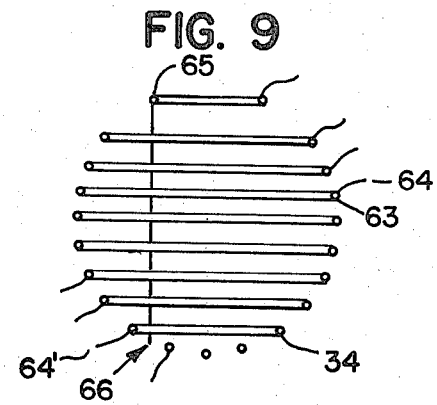
FIG. 9 is a diagrammatical representation which sets forth an important teaching of the present invention.

FIG. 1 schematically discloses a borehole 10 formed within the earth 11 by earth boring apparatus 12 which includes a drill string 13 attached thereto. The lower marginal end portion of the string includes a sub 14 which interconnects the drill pipe of the string to the drill bit 15. The sub has incorporated therewithin apparatus made in accordance with the present invention for sensing and sending information up the drill string and to a receiving apparatus 16. The receiving apparatus is attached at 16' to the upper extremity of the string.

As seen in FIGS. 2 and 3, in conjunction with FIG. 1, the before mentioned sub 14 is provided with an exterior wall surface 17 and an interior wall surface 18, the latter of which forms a chamber 19 of limited length therewithin. A plurality of radially spaced apart flow passageways 20 enables the flow of drilling fluid to continue through the string and to the drill bit.

FIG. 2 diagrammatically discloses a unitized package 21 which includes a sonics generator 23. The generator is powered by an amplifier 24. An oscillator 25 receives a signal from a sensor 26 and imposes the received signal upon the amplifier. Centrifugal switch 27, the details of which will be more fully explained later on in this disclosure, provides current flow from a power package 28 to the sensor.

As seen in the detailed illustration of FIG. 4, the sensing unit is comprised of a first pendulum assembly 30 which is superimposed in axially aligned relationship with respect to a second pendulum assembly 31. Each pendulum assembly of the sensing unit is telescopingly received within its housing with its illustrated circumferentially extending shoulder being abuttingly received against a complementary shoulder formed by a counterbore 32. Lock ring 33 captures and anchors the unit within its housing.

A plurality of spaced apart circumferentially extending parallel electrical conductor elements 34 are insulated from one another and form an upwardly opening and outwardly directed cavity. Multiple conductor 35 has included therein a plurality of conductors each of which are attached to one of the elements 34. Contact 36 is affixed to the free terminal end portion of a pendulum 37 with the pendulum being journaled at 38 to a fitting 39. The mass of the pendulum is arranged to cause it to be vertically disposed when at rest. Fitting 39 is attached to the lateral shaft member with the shaft member being journaled to the cavity housing as generally indicated by numeral 40.

Conductor 41 electrically connects switch 27 with other circuitry of the apparatus. Conductor 42 is connected to the various elements 34 of the first pendulum assembly 30. It will be noted in FIG. 6 that aperture 135 extends through an upper face 44 of the housing so as to permit conductor 35 to extend through the housing at a location which is free of the cavity.

In FIG. 7, the power supply is seen to be connected to the centrifugal switch 27, which in turn is connected to the sensor unit 26. A plurality of wires are each connected to different ones of the elements 34, with each wire being connected to a different oscillator 25. For example, junction 48 of oscillator 25 is connected to one of the wires leading to an element of the pendulum assembly while junction 49 is connected to another oscillator 25', for example, and so on, until there is present in the circuitry one oscillator for each one of the elements 34.

The oscillator generates a frequency at junction 50, 51, for example, with each of the illustrated capacitors being tied to a common terminal 52. The terminal 52 is connected to the amplifier 24 which drives the sonic generator 23 by a suitable means, such as generally illustrated by the arrow at numeral 23', for example. For further particulars of the circuitry of the generator, reference is made to the U.S. Pat. to Murphy No. 3,004,613, and in particular to FIG. 10 thereof.

FIG. 8 illustrates a modification of the sensing unit seen in FIG. 4, wherein the cavities of the adjacent sensors are placed adjacent to one another so as to form a spherical chamber. The pendulum 137 has included thereon an extension in the form of a diametrically opposed like portion 137', with journal 38 forming a common journal therebetween.

Element 63 has conductor 64 leading therefrom and to a junction such as 48 of FIG. 7, for example. The pendulums are weighted so as to always be vertically disposed when the bit is stationary. Element 65 of the upper pendulum assembly is misaligned with its corresponding element of the first or lower pendulum assembly in a manner illustrated by the dashed line 66. Aperture 67 has a multiple conductor 68 leading therefrom with each individual conductor thereof being attached to one of the elements such as seen at 63. A similar aperture 69 has a multiple conductor leading therefrom and back up through the cavity housing so as to enable the various conductors thereof to be connected into the circuitry of FIG. 7. The bulkhead 71 can be attached to the housing by any suitable means, such as screws 72, 73, for example.

Figure 11:
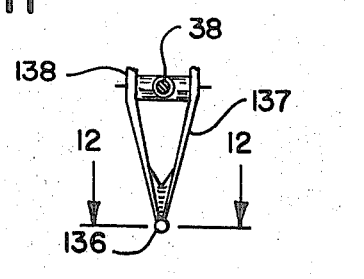
FIG. 11 is a fragmentary, cross-sectional view taken along line 11—11 of FIG. 10.
Figure 10:
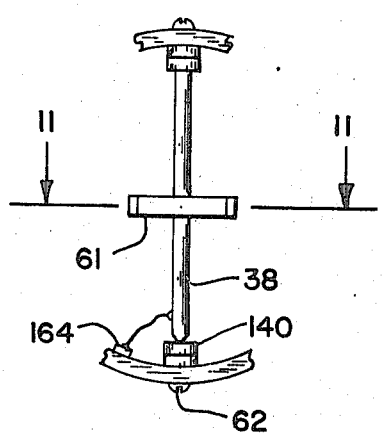
FIG. 10 is an enlarged, broken, top plan view of part of the apparatus seen in FIG. 8.

As seen in FIGS. 10 and 11, the pendulums 137, 137' are journaled to shaft 38 with the shaft being journaled to the cavity housing. Grounding wire 164 completes the circuit from the pendulum to the elements supported by the housing.

Figure 12:
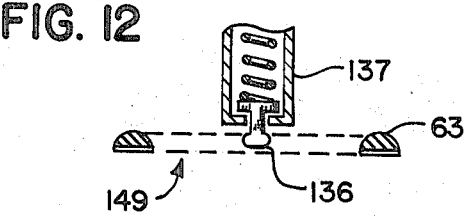
FIG. 12 is a fragmentary cross-sectional view of part of the apparatus seen in FIG. 11.

As seen in FIG. 12, each circumferentially extending element 63 establishes a circuit when the free depending end of the pendulum is connected thereto by the means of the illustrated contact. The contact is seen to be comprised of a spring loaded carbon button with the button being reciprocatingly received and outwardly biased of its illustrated housing.

Figure 13:
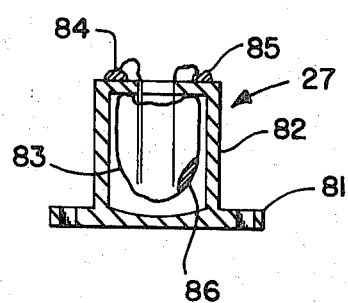
FIG. 13 is a cross-sectional view of apparatus used in conjunction with FIGS. 1, 2, and 7.

FIG. 13 illustrates one form of the before mentioned centrifugal switch 27 wherein a base 81 supports a cylindrical housing 82, within which there is disposed a glass chamber 83. The glass chamber has two electrodes depending thereinto, and electrically connected to terminals 84, 85. A blob or droplet of mercury 86 is forced into the illustrated position while the drill bit is being rotated, and when the bit is stationary, the blob or droplet will roll by gravity to the lower extremity of the glass chamber to thereby electrically short circuit terminal 84 and 85.

In operation, the apparatus disclosed in either of FIG. 4 or 8 is assembled to accumlatively provide the desired sensitivity in measuring hole deviation, and the apparatus is connected to a centrifugal switch such as disclosed in FIG. 13, and to the circuitry as illustrated in FIG. 7. The package 21 is telescopingly received within chamber 19 of sub 14 and interposed within the lower extremity of a drill string, whereupon the drilling operation of FIG. 1 commences. From time to time, when it is desired to measure hole deviation, the rotation of the bit is stopped, whereupon switch 13 closes and the circuitry of FIG. 7 is energized to thereby send a signal up the drill string pipe. The signal is received by receiver 16 which discriminates between the various possible frequencies provided by the apparatus so as to enable determination of the particular oscillator which is connected to the sonic generator. Since the frequency of each oscillator is different from the other, they each relate to a particular angular displacement from the vertical. For example, a 1.3° deviation could be provided by oscillator 25', while the adjacent oscillator will indicate a 1.6° deviation.

Upon determining the magnitude of hole deviation, remedial measures may be employed by the driller. On the other hand, perhaps the borehole will be continued in depth for a few hundred more feet in order to determine the trend of the deviation.

As the drill bit is brought to a stop and the switch 13 energizes the circuitry of FIG. 7, current flows from the battery, through the switch, and through the pendulum, whereupon the pendulum enables current to continue to flow through one of the elements 34 and to its associate oscillator 25, for example. The oscillator provides a selected frequency at terminal 52 which is amplified at 24 so as to provide a suitable current for driving the sonic generator 23, 23'.

The number of pendulum assemblies 30, 31 employed as well as the spacing of the individual elements 63 determines the sensitivity of the apparatus. Where only two sensing units are employed in the manner of FIGS. 4 or 8, the needle 137, 137' will alternately contact one of the elements of the first or second sensor as the deviation increases. With a cavity one inch in diameter, it is possible to measure less than 1° increments of hole deviation where a printed circuit is employed to provide the elements 34. By employing two pendulum assemblies, the accuracy is doubled. Hence, the number of sensors superimposed one above the other determines the precision of measurement of hole deviation.

I claim:

1. Apparatus for determining the angular inclination of a borehole comprising a source of electrical power; a pair of sensors, each of said sensors having a spherically concave cavity, said sensors being arranged with the cavities thereof disposed adjacent to each other so as to jointly form a sphere; journal means for pivotally supporting a pendulous body at the center of said sphere; means forming a plurality of parallel spaced apart circumferentially extending current conducting elements on the surface of each cavity, each conducting element of each sensor being misaligned with each conducting element of the other sensor, means by which each of said conducting elements is electrically insulated from the other conducting elements; a pair of contact members mounted at diametrically opposite portions of said pendulous body for electrically engaging the one of said conducting elements on either of said cavities which is aligned with one of said contact members when the pendulous body is displaced by gravity with respect to said cavities into contact with said one of said conducting elements, and circuitry means including a generator means for establishing a flow of electrical current from said one conducting element, to said contact members, and to said source of power; said generator means being connected to each conductor element for producing a signal when one of said contact members is engaging a current conducting element, the signals produced by engagement with each different conducting element all being different from one another.

2. The apparatus of claim 1 wherein said circuit means includes a centrifugal switch, said switch adapted to render the apparatus inoperative during borehole drilling operations.

3. The apparatus of claim 1, and further including a sub; means forming a central chamber and a plurality of radial passageways about said central chamber; said sensors, generator, source of power, and circuit means adapted to be placed within said central chamber; whereby, said sub can be interposed in a drill string and drilling fluid can flow through the string, through the radial passageways, and to the bit.

4. The apparatus of claim 1, wherein said circuit means includes a mercury switch; said mercury switch including a housing, a pair of conducting contacts; and a droplet of mercury; whereby:

rotation of said switch causes the droplet of mercury to move away from the pair of conducting contacts so that the conducting contacts are rendered nonconducting.

5. The apparatus of claim 1 wherein said generator means includes a sonic generator; the signal produced by each conducting element having a different frequency relative to the signal produced by the remaining conducting elements so that the frequency of the signal can be related to the magnitude of borehole deviation.

* * * * *